United States Patent [19]
Rogers

[11] 3,718,192
[45] Feb. 27, 1973

[54] IMPLEMENT TOOL ARM CONTROL
[75] Inventor: Chester D. Rogers, Olathe, Kans.
[73] Assignee: Jacobsen Manufacturing Company, Racine, Wis.
[22] Filed: Nov. 20, 1970
[21] Appl. No.: 91,468

[52] U.S. Cl. .................172/624, 172/657, 172/669
[51] Int. Cl. ..............................................A01b 35/28
[58] Field of Search......172/540, 548, 574, 581, 568, 172/554, 556, 541, 413, 422, 463, 488, 491, 397, 619, 669, 675, 624, 613, 763, 122, 776, 657; 111/1

[56] References Cited

UNITED STATES PATENTS

| | | | |
|---|---|---|---|
| 3,611,956 | 10/1971 | Moore et al. | 111/62 |
| 3,277,802 | 10/1966 | Peterson | 172/554 X |
| 3,247,812 | 4/1966 | Luciano et al. | 111/1 |
| 3,236,312 | 2/1966 | Vivas | 172/122 X |
| 3,186,497 | 6/1965 | Forbes | 172/624 X |
| 2,078,501 | 4/1937 | Maloon | 172/421 |

Primary Examiner—William B. Penn
Assistant Examiner—Stephen C. Pellegrino
Attorney—Schmidt, Johnson, Hovey & Williams

[57] ABSTRACT

A towable turf maintenance implement has a heavy, vertically swingable front frame provided with vertically spaced, upper and lower cross pipes common to a series of fore-and-aft extending arms therebetween that are pivoted to the frame forwardly of the pipes for independent vertical swinging. Each of the arms is longitudinally, forwardly tapered and formed from sheet material, and each supports a ground-engaging tool adjacent the rear widened end thereof. During advancement of the implement, the weight of the swingable frame is borne equally by all of the arms through the upper cross pipe until compacted soil or ground contours cause certain of the arms and tools to rise relative to the remaining arms, at which time the entire weight of the frame is borne by the relatively raised arms.

5 Claims, 6 Drawing Figures

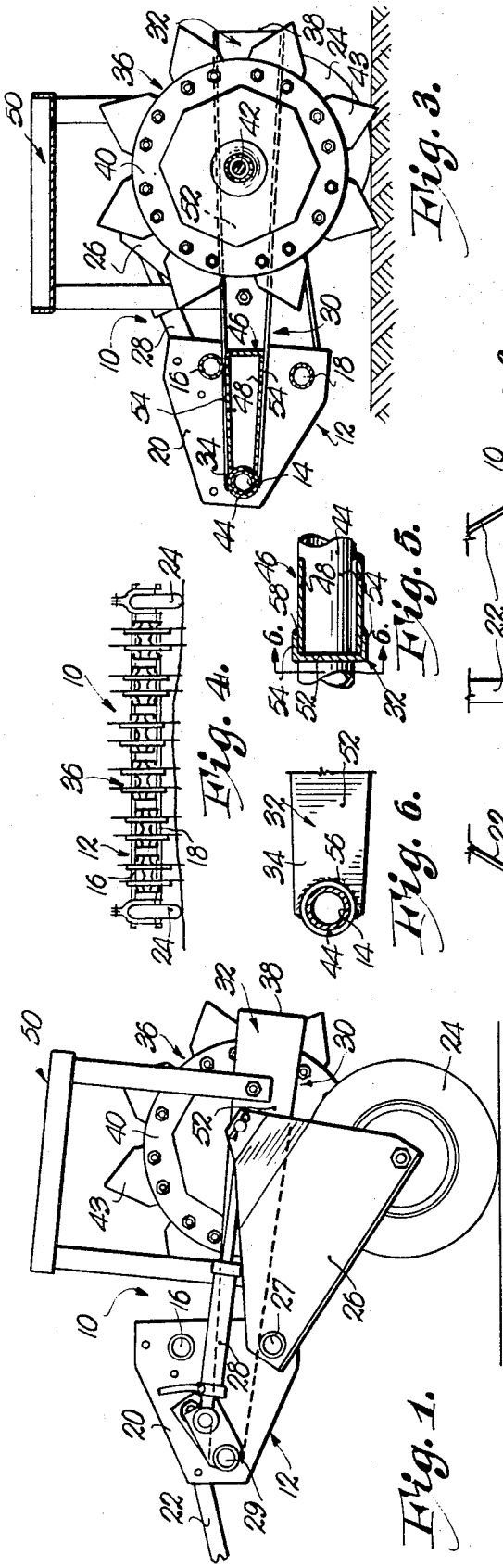
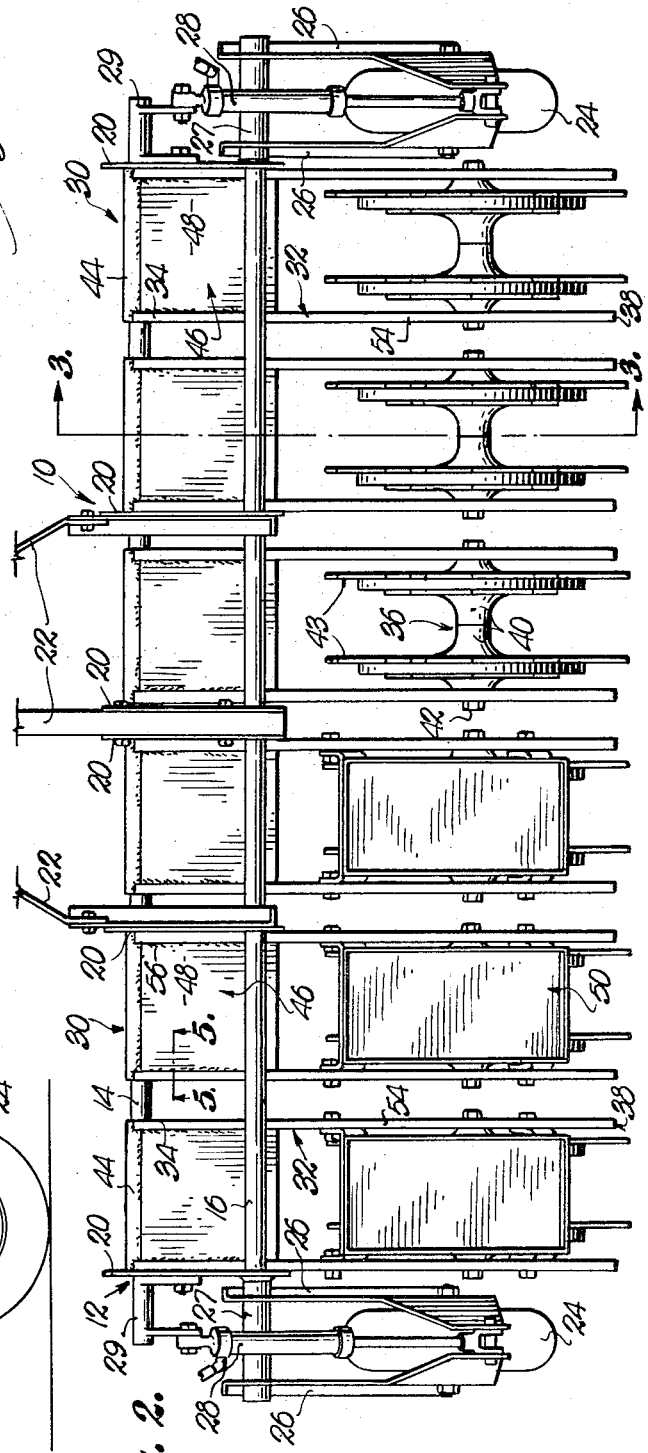

IMPLEMENT TOOL ARM CONTROL

This invention relates to improved tool support structure for a ground-working implement such as a turf maintenance machine.

Such a machine may be hitched to a towing vehicle for advancement over compacted soil and equipped with a forwardmost, laterally extending, elongated frame that is adapted through the hitch for swinging about a horizontal axis transverse to the path of travel of the vehicle. A plurality of fore-and-aft extending arms each support tools at one end thereof and are each pivotally coupled to the frame at the opposite end thereof for independent, vertical swinging movement between an upper stop and a lower lifting element, both of which are common to all of the arms.

This arrangement permits contour following on uneven ground as the arms rise and fall independently of one another and also permits the full weight of the frame, because of its pivotal coupling with the vehicle, to be borne by those arms and tools that encounter a hard-packed area, thus assuring maximum penetration of the soil. This manner of weight concentration is brought about when the arms affected by the packed area seek to rise against the stop relative to the remaining unaffected arms such that the remaining arms do not engage the stop. This leaves only the relatively raised arms to support the weight of the frame through the upper stop.

The tools on the arms may have dimensions that require the tools to be located on the arms at a distance from the stop that is greater than the distance between the latter and the pivotal connection of the arms with the frame. This relationship necessarily subjects the rearmost areas of each arm to substantially greater loading than the forward portions thereof, requiring that the arms be constructed in a manner to fully accommodate such increased loading without unduly limiting the extent of swinging of each arm between the stop and the lifting element.

With the above basic structure and loading principles in mind, it is an important object of the present invention to provide improved, low-cost, easily fabricated arms for the implement without sacrificing strength and safety, and without impairing or decreasing in any way the extent of swinging of the arms between the upper stop and the lower lifting element.

A further important object of the instant invention is the provision of improved arms as aforesaid which are adapted to fit readily into their proper positional relationships with other components of the implement to facilitate the formation of rigid junctions between the components and the arms, and thereby contributing to the production of a sturdy, structurally sound implement that will hold up under prolonged use.

In the drawing:

FIG. 1 is a side elevational view of a turf-conditioning machine utilizing tool support arms constructed in accordance with the principles of my present invention, the tools being shown in a raised condition for over-the-road travel;

FIG. 2 is a top plan view of the machine in FIG. 1, the weight trays on the right half of the machine being removed for clarity;

FIG. 3 is a vertical cross-sectional view taken along line 3—3 of FIG. 2 with the tools lowered into a ground-engaging position;

FIG. 4 is a fragmentary, rear elevational view of the machine on a reduced scale, illustrating the contour following action of the tools on uneven ground;

FIG. 5 is an enlarged, fragmentary, vertical cross-sectional view taken along line 5—5 of FIG. 2; and FIG. 6 is a fragmentary, vertical cross-sectional view taken along line 6—6 of FIG. 5.

Machine 10 has a heavy, elongated frame 12 comprising three pipes 14, 16 and 18 that are held in spaced relationship to one another at the corners of an isosceles triangle by a number of laterally spaced, generally trapezoidal, upstanding plates 20. Certain of the central plates 20 are adapted to be rigidly secured to the components 22 of a drawbar assembly which, in turn, may be hitched to a tractor or other suitable vehicle (not shown) in a manner to permit swinging of the drawbar components 22 and frame 12 about a horizontal axis extending transversely to the path of travel of the vehicle.

Frame 12 is supported during over-the-road travel by a pair of ground-engaging wheels 24 that are axled at opposite ends of frame 12 between a pair of triangular sections 26 secured at one corner thereof to a rotatable extension 27 of the lower pipe 18 for rotation about the longitudinal axis of the latter. A hydraulic piston and cylinder assembly 28 interconnecting each set of sections 26 and an extension 29 of the front pipe 14 may be actuated to raise and lower frame 12 with respect to the wheels 24.

A number of laterally spaced, individual tool units 30 are pivoted to the pipe 14 for independent, vertical swinging about the longitudinal axis of pipe 14. Each unit 30 includes a pair of elongated, fore-and-aft extending arms 32 between pipes 16 and 18 that are secured at their forwardmost ends 34 to pipe 14 and support a rotary tool 36 adjacent their rearwardmost ends 38. Each tool 36 comprises a pair of side-by-side wheels 40 having suitable bearing means (not shown) that mount each wheel 40 for rotation on a common support axle 42 extending between opposed arms 32 and spaced farther from pipes 16 and 18 than the distance between the latter and pipe 14. Each wheel may be provided with various and sundry blades or tines circumferentially attached to its periphery as, for example, the triangular slicing blades 43 illustrated in the drawing.

Vertical swinging of the units 30 is permitted through the provision of an outer sleeve member 44 rigidly secured between the forward ends 34 of each pair of arms 32 and rotatably surrounding pipe 14. A box-like brace 46 having upper and lower plates 48 is disposed between and secured to the arms 32 to lend structural support for each unit 30 and, if desired, a weight tray 50 may be mounted on each unit 30 above the corresponding tool 36.

The configuration of and material used in the fabrication of each arm 32 is of particular importance. In this regard, it has been found that the use of a length of flat bar stock for each arm 32 is less than desirable for several reasons, including the fact that it is relatively expensive to use and its uniform, rectangular shape is not particularly conducive to providing safe, secure junctions with the arcuate periphery of sleeve 44 and with brace 46.

These problems are avoided in the present invention without impairing proper operation of machine 10 or sacrificing safety by forming each of the arms 32 from sheet material and tapering each arm 32 longitudinally thereof such that its vertical width progressively decreases as the pipe 14 is approached. Each formed arm 32 has an upstanding, longitudinally tapered web 52 throughout its length provided with an inwardly turned, lateral flange 54 on the opposed upper and lower longitudinal edges of web 52 coextensive in length with the latter. The support axle 42 for each pair of arms 32 is located within the body of the corresponding web 52 thereof.

One direct and very noticeable result of this manner of construction of the arms 32 lies in the improved overall structural qualities of each unit 30 as illustrated best in FIGS. 5 and 6. The relatively thin nature of web 52 as compared to the thick dimensions of bar stock permits an arcuate cutout portion to be quickly and easily provided in the forwardmost end thereof for complementally receiving the outer periphery of sleeve 44. An arcuate weld bead 56 may then be easily interposed between the converging inner face of web 52 and the periphery of sleeve 44 as illustrated.

Moreover, the provision of the cutout in web 52 permits the leading ends of flanges 54 to straddle sleeve 44 for subsequent welding thereto. Furthermore, the opposed flanges 54 on each arm 32 also readily accept and carry therebetween the brace 46 such that the upper and lower brace plates 48 abut the webs 52 of opposed arms 32 with the flanges 54 overlapping plates 48. A weld bead, as at 58, may be easily placed along the proximal edges of flanges 54 and the faces of plates 48 to provide a sturdy, compact unit 30.

The effect of the special tapered configuration of each arm 32 can best be seen after a full understanding of the operation of machine 10. When the machine 10 is placed in tow behind a vehicle over fairly level ground with the blades 43 of each unit 30 engaging the ground as illustrated in FIG. 3, the frame 12 swings downwardly about its horizontal coupling (not shown) with the vehicle until the upper flanges 54 on all of the arms 32 abut the common pipe 16, the latter thereby serving as an upper stop. Accordingly, the weight of the frame 12 is distributed evenly over all of the arms 32 so as to apply a substantially identical downward force to each tool 36.

However, in the event that a contour or hard-packed area is encountered by certain of the units 30, the tools 36 of those units 30 affected by the contour or packed area will seek to rise to a level above the remaining units 30 as illustrated in FIG. 4. Simultaneously, such remaining unaffected units 30 drop away from the upper pipe 16 such that the weight of frame 12 is borne entirely by the affected units 30.

If the height or compactness differential should become great enough to permit the unaffected units 30 to drop until their arms 32 are supported by lower pipe 18, then the arms 32 of the affected units 30 will support the combined weight of the unaffected units 30 plus that of frame 12. This weight concentration in either instance greatly increases the downward force acting upon the affected arms 32 to encourage maximum penetration of the ground or permit contour following as the case may be.

It is readily apparent that the arms 32 must, therefore, be constructed in a manner to accept without failure the relatively sudden application of greatly increased concentrated loading at certain points along their lengths. The formed construction and special tapered configuration of each arm 32 ideally prepare the latter for handling this abrupt loading increase at a minimum cost and with maximum safety.

In view of the greater distance between the support axle 42 and pipes 16 and 18 than between the latter and pipe 14, a greater amount of such increased loading must necessarily be carried by the outer extremities of each arm 32, particularly at support axle 42. Accordingly, it will be appreciated that the tapered configuration of each arm 32 causes the inherent strength of the latter to gradually and progressively increase as the axle 42 is approached to thereby fully account for any strength which might otherwise be lost as a result of the use of sheet material for web 52.

While the required inherent strength of each arm 32 could be obtained by increasing its vertical width uniformly over the entire length thereof so as to present a rectangular appearance, such action would result in a costly waste of material in view of the particular loading characteristics of each arm 32 as above explained, and would also adversely affect the free-swinging nature of each unit 30. Therefore, each arm 32 should preferably be formed with a vertical width between pipes 16 and 18 that is not appreciably greater than the vertical width of bar stock that would otherwise be used. If this dimension were allowed to increase substantially, it would then be necessary to reposition the pipes 16 and 18 a substantially greater distance apart in order to avoid unduly limiting the extent of vertical swinging of each arm 32 beyond the amount desirable for proper operation of the machine 10.

It should now be readily apparent that through such tapering, it is possible to maximize the structural strength of each arm 32 at the point of greatest loading thereon, while at the same time, appreciably decreasing its material cost, all without adversely affecting the extent of swinging of the units 30.

The machine 10 may be quickly and easily prepared for over-the-road travel as shown in FIG. 1 by actuating the hydraulic assemblies 28, causing extension of each stem thereof, whereby to rotate the triangular sections 26 and raise the frame 12 relative to the wheels 24 and the arms 32. Continued actuation of assemblies 28 brings the lower lifting pipe 18 into engagement with the lower flanges 54 on all of the arms 32 to simultaneously raise all of the units 30. In this condition the arms 32 of each unit 30 need only support the weight of their own unit 30, although in the event that units 30 bounce during transport, it will be appreciated that the increased strength of each arm 32 in the rearmost areas thereof will again prove beneficial in preventing structural failures.

Having thus described the invention, what is claimed as new and desired to be secured by Letters Patent is:

1. In a ground-working implement:
   an elongated frame adapted for hitching to a towing vehicle for projection transversely of the path of travel of the vehicle and including a pair of longitudinally extending, vertically spaced apart, upper and lower stops;

a plurality of elongated, fore-and-aft extending arms pivotally coupled to said frame for individual, vertical swinging movement between said stops; and a ground-engaging and frame-supporting tool mounted on each of said arms respectively and spaced from said stops for bearing a proportionate share of the load of said frame as determined by the number of said arms upon which said upper stop rests at any given point in time, the loading on said arms and their corresponding tools varying in accordance with gravitational swinging of certain of the arms and their tools away from the upper stop when depressions in the terrain are encountered by such certain arms and tools, leaving other arms against the upper stop so that loading is concentrated in such other arms and their tools, said arms each being longitudinally tapered to decrease in vertical width as said upper stop is approached from the tool of the arm, each of said arms being formed from sheet material and having an upstanding web throughout its length provided with lateral flanges along the upper and lower longitudinal edges respectively of the web and coextensive in length with the latter.

2. The invention of claim 1 wherein the tool of each arm is mounted in said web of its arm.

3. The invention of claim 1, wherein the coupling for each arm with the frame includes relatively rotatable inner and outer members, said flanges of the web straddling said outer member and being affixed thereto.

4. The invention of claim 3 wherein said web is provided with means at the end of its arm opposite its tool complementally receiving the outer periphery of said outer member, 5. The invention of claim 1, wherein said arms are coupled with the frame in pairs spaced along the latter, each of said pairs having a brace plate interconnecting the same, said plate abutting the webs of said arms, and at least one flange on each web overlapping the plate and being secured thereto.

* * * * *